US012811321B2

(12) United States Patent
Nayak et al.

(10) Patent No.: US 12,811,321 B2
(45) Date of Patent: Nov. 24, 2026

(54) MULTI-PLANE HIGH DENSITY CONNECTOR

(71) Applicant: Sandisk Technologies, Inc., Mipitas, CA (US)

(72) Inventors: Shailesh R. Nayak, Bangalore (IN); Arun Anirudhan, Bangalore (IN); Praichandran Gnanavelan, Krishnagiri (IN); Joe Paul Moolanmoozha, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 663 days.

(21) Appl. No.: 18/360,167

(22) Filed: Jul. 27, 2023

(65) Prior Publication Data

US 2024/0396240 A1 Nov. 28, 2024

Related U.S. Application Data

(60) Provisional application No. 63/503,991, filed on May 24, 2023.

(51) Int. Cl.
*H01R 12/72* (2011.01)

(52) U.S. Cl.
CPC .................................. *H01R 12/721* (2013.01)

(58) Field of Classification Search
CPC ...................................................... H01R 13/02
USPC ............................................................ 439/78
See application file for complete search history.

(56) References Cited

U.S. PATENT DOCUMENTS

| | | | | |
|---|---|---|---|---|
| 5,071,371 A * | 12/1991 | Harwath | H01R 12/721 | 439/60 |
| 10,566,720 B2 * | 2/2020 | Wang | H01R 12/79 | |
| 11,196,220 B2 * | 12/2021 | Tu | H01R 12/721 | |
| 2008/0268702 A1 * | 10/2008 | Little | H01R 12/721 | 439/62 |
| 2013/0084754 A1 * | 4/2013 | Mason | H05K 1/118 | 174/254 |
| 2014/0017940 A1 * | 1/2014 | Chen | H01R 13/6477 | 439/607.02 |
| 2022/0013942 A1 * | 1/2022 | Guo | H05K 1/0213 | |
| 2022/0102886 A1 * | 3/2022 | Lau | H05K 1/117 | |
| 2023/0032371 A1 * | 2/2023 | Farkas | H05K 1/117 | |

* cited by examiner

*Primary Examiner* — Abdullah A Riyami
*Assistant Examiner* — Amara Anderson
(74) *Attorney, Agent, or Firm* — Dentons Durham Jones Pinegar P.C.

(57) ABSTRACT

A multi-plane high density connector for an electronic device is an edge connector that extends from a body of the electronic device. The body of the electronic device includes a multi-layer printed circuit board (PCB) where PCB layers are stacked on top of each other. Two or more of the PCB layers have exposed surfaces at least at one end of the PCB, where the exposed surfaces define different planes. Further, each plane of the edge connector includes a row of pins. Signals may be routed from each row of pins in each plane. This reduces an overall number of vias required to route signals from each of the different rows of pins to respective components of the electronic device.

20 Claims, 7 Drawing Sheets

MULTI-PLANE HIGH DENSITY CONNECTOR

CROSS-REFERENCE TO RELATED APPLICATIONS

The present application claims priority to U.S. Provisional Application 63/503,991 entitled "MULTI-PLANE HIGH DENSITY CONNECTOR", filed May 24, 2023, the entire disclosure of which is hereby incorporated by reference in its entirety.

BACKGROUND

A data storage device, such as a non-volatile data storage device, typically includes a connector that connects the data storage device to a host device. For example, a solid state drive (SSD) may use an edge connector to interface with a Peripheral Component Interconnect Express (PCIe) bus or other connector on a motherboard of the host device. The edge connector typically includes a first row of pins or other contacts on a first surface of the edge connector and a second row of pins or other contacts on a second surface of the edge connector opposite the first surface.

Typically, an edge connector can only accommodate pins on two surfaces. As such, a pin density of the edge connector is limited. In order to accommodate more pins, a width of the edge connector must be increased. However, if a width of the edge connector is increased, a width of a corresponding PCIe connector on the motherboard of the host device must also be increased. Due to size constraints, increasing a width of the edge connector and/or the PCIe connector may not be desirable or possible.

Accordingly, it would be beneficial for an edge connector of a data storage device to have increased pin density without increasing the width of the edge connector.

SUMMARY

The present application describes a multi-plane high density connector for an electronic device. In an example, the electronic device is a non-volatile storage device (e.g., a solid state drive (SSD)) or other data storage device. Although a data storage device is specifically mentioned, the multi-plane high density connector described herein may be used to communicatively couple various computing components and/or electronic devices to a host device.

In an example, a body of the electronic device includes a multi-layer printed circuit board (PCB) where the layers are stacked on top of each other. Each layer of the PCB may be electrically and/or communicatively coupled to the other layers. Additionally, each layer may have an exposed surface that defines a plane. For example, a first layer may have a first exposed surface that defines a first plane and a second layer may have a second exposed surface that defines a second plane. The second exposed surface that defines the second plane extends past or beyond the first exposed surface that defines the first plane.

The multi-plane high density connector may be an edge connector that extends from the body of the electronic device. The edge connector may include portions of each exposed surface or plane. For example, the edge connector may include a portion of the first exposed surface that defines the first plane and a portion of the second exposed surface that defines the second plane. Further, a row of pins or other contacts is provided on each exposed surface. Thus, the first plane of the edge connector may have a first row of pins and the second plane of the edge connector may have a second row of pins.

Accordingly, the present application describes an electronic device that includes a multi-layer printed circuit board (PCB). The multi-layer PCB has a first exposed surface that defines a first plane and a second exposed surface that defines a second plane. The electronic device also includes an edge connector extending from the multi-layer PCB. In an example, the edge connector includes a first portion of the first exposed surface. A first set of pins is provided on a surface of the first portion of the first exposed surface. The edge connector also includes a second portion of the second exposed surface. In an example, the second portion extends past the first portion of the first exposed surface. A second set of pins is also provided on a surface of the second portion of the second exposed surface.

In another example, an electronic device is described. The electronic device includes a multi-layer printed circuit board (PCB) having a first layer and a second layer. In an example, the first layer defines a first plane and the second layer extends past the first layer and defines a second plane. The electronic device also includes an edge connector. The edge connector includes a first portion of the first plane and a first row of pins on a surface of the first portion of the first plane. The edge connector also includes a second portion of the second plane and a second row of pins on a surface of the second portion of the second plane.

In yet another example, an electronic device includes a multi-layer printed circuit board (PCB) and a multi-plane connection means extending from the multi-layer PCB. The multi-plane connection means includes a first set of contact means provided on a first plane of the multi-plane connection means. The multi-plane connection means also includes a second set of contact means provided on a second plane of the multi-plane connection means. In an example, the second plane extends beyond the first plane.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
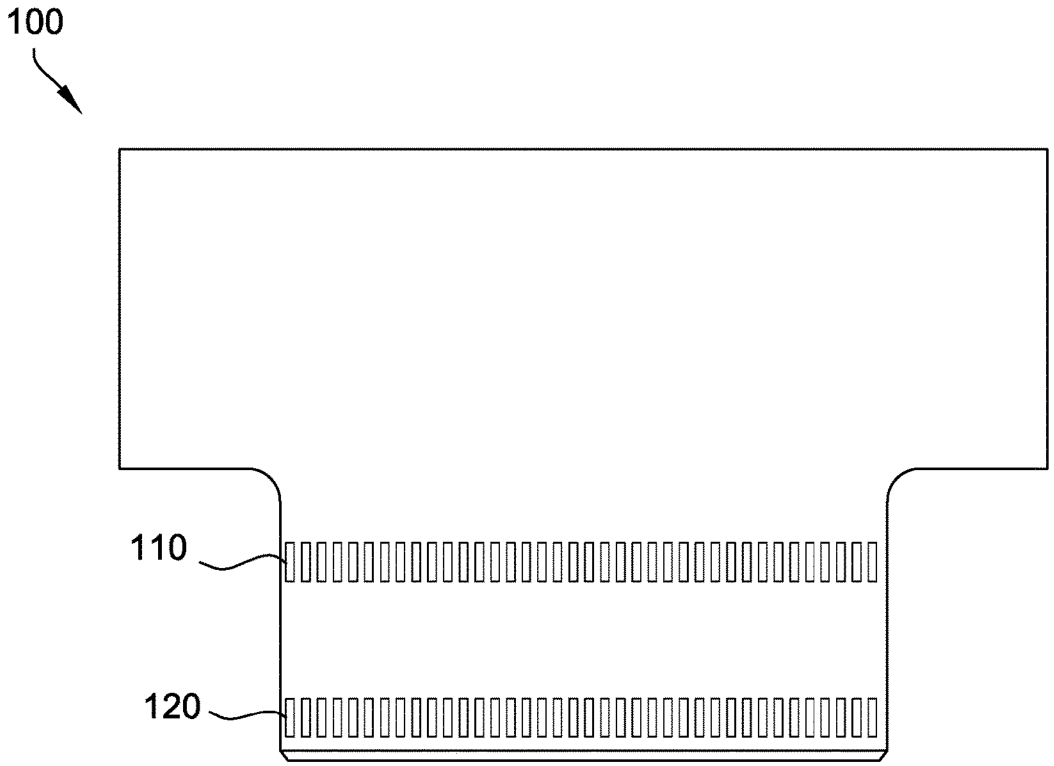
FIG. 1A illustrates a double density edge connector according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Electronic devices, such as data storage devices, typically include a connector (e.g., an edge connector) that connects the electronic device to a host device. For example, an edge connector of a data storage device may be used to connect the data storage device to a Peripheral Component Interconnect Express (PCIe) bus or other connector on a motherboard of the host device. The edge connector typically includes a first row of pins, or other contacts, on a first surface and a second row of pins, or other contacts, on a second surface that is opposite the first surface.

However, an edge connector can only accommodate pins on those two surfaces. As such, pin density of the edge connector is limited. In order to accommodate more pins, a width of the edge connector must be increased. If a width of the edge connector is increased, a width of a corresponding PCIe connector on the motherboard of the host device must also be increased. However, increasing a width of the edge connector and/or the PCIe connector may not be desirable or possible.

Another solution to increase pin density on an edge connector is to utilize a double density edge connector. Typically, a double density edge connector is an edge connector that has up to two rows of pins or contacts on each side of the edge connector. While this allows for twice as many contacts, the additional rows of pins increases routing complexity. Additionally, as additional rows of pins are added, additional vias are needed to route signals which negatively affects signal speeds in high-speed applications.

In order to address the drawbacks described above, the present application describes a multi-plane high density connector for an electronic device. The body of the electronic device includes a multi-layer printed circuit board (PCB). In an example, each layer of the PCB is stacked on top of another layer. Further, each layer of the multi-layer PCB may be electrically and/or communicatively coupled to the other layers.

Each layer of the multi-layer PCB may have an exposed surface that defines a plane. For example, a first layer of the multi-layer PCB may have a first exposed surface that defines a first plane and a second layer of the multi-layer PCB may have a second exposed surface that defines a second plane. In an example, the second exposed surface that defines the second plane extends past or beyond the first exposed surface that defines the first plane.

In an example, the multi-plane high density connector is an edge connector that extends from the body of the electronic device. As previously described, the edge connector may include portions of each exposed surface or plane from each layer. For example, the edge connector may include a portion of the first exposed surface that defines the first plane and a portion of the second exposed surface that defines the second plane.

The edge connector may also include multiple rows of pins or other contacts. For example, a first row of pins is provided on the first exposed surface (or the first plane) and a second row of pins is provided on the second exposed surface (or the second plane).

Signal lines may extend from each row of pins on each plane. For example, a first set of signal lines may originate from the first row of pins and extend, at least partially, along the first layer of the multi-layer PCB. Likewise, a second set of signal lines may originate from the second row of pins and extend, at least partially, along the second layer of the multi-layer PCB.

Because signal lines originate on different layers or planes, an overall number of vias for signal routing is reduced when compared with current solutions. As the number of vias is reduced, the chance for signal loss is also reduced. In addition to this benefit, other technical benefits of the multi-plane high density connector may be realized including, but not limited to, enabling the electronic device to be hot swapped, which allows for seamless integration of new components with a host device or system, improving power efficiency and component density by directly feeding power into inner layers of the electronic device without the use of vias, and increasing pin density while maintaining or reducing a width of the electronic device and/or an associated PCIe connector on a motherboard.

These and other benefits will be described in greater detail below with respect to FIG. 1A-FIG. 6.

FIG. 1A illustrates a double density edge connector 100 according to an example. The double density edge connector 100 includes a first row of pins 110 positioned at a first location and a second row of pins 120 positioned at a second location. The double density edge connector 100 may include a third row of pins and a fourth row of pins on an opposite side.

While the double density edge connector 100 increases pin density, there are a number of drawbacks to using the double density edge connector 100. For example, additional vias are needed to route signal lines from the first row of pins 110 and/or the second row of pins 120 to one or more components associated with an electronic device that utilizes the double density edge connector 100. The double density edge connector 100 is also limited to two rows of pins per side (for a maximum total of four rows).

Additionally, the number of times the second row of pins 120 is inserted into and past connection points of a connector, will be two times greater than the first row of pins 110. This decreases the durability of the second row of pins 120. Another drawback of the double density edge connector 100 is that during hot insertion and removal, the second row of pins 120 may contact connection points in the connector that are meant for the first row of pins 110.

Figure 1B:
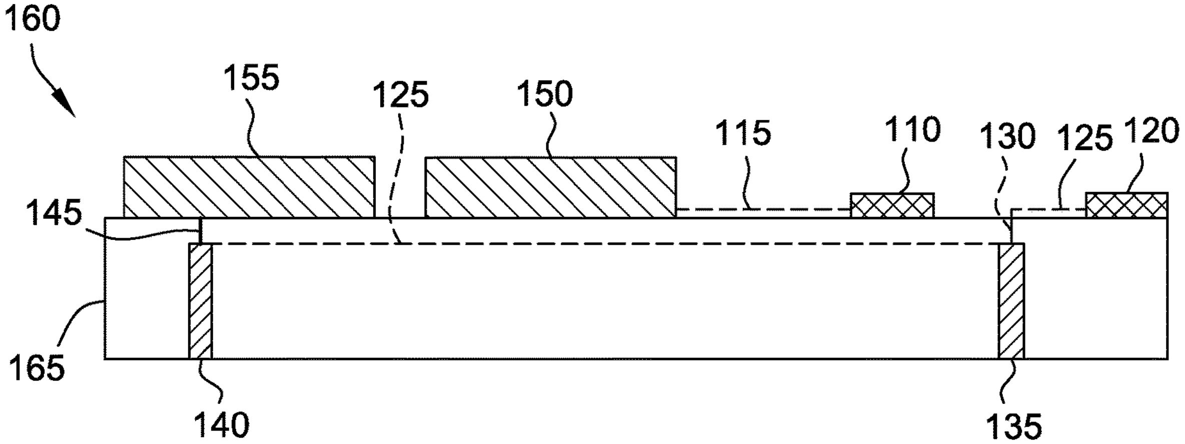
FIG. 1B illustrates how signals are routed to components of an electronic device that utilizes the double density edge connector of FIG. 1A according to an example.

FIG. 1B illustrates how signals are routed to components of an electronic device 160 that utilizes the double density edge connector 100 of FIG. 1A according to an example. As previously discussed, the double density edge connector 100 includes a first row of pins 110 and a second row of pins 120. Each of the first row of pins 110 and the second row of pins 120 are provided on a surface of a PCB 165 of the electronic device 160.

Further, the electronic device 160 includes a first component 150 and a second component 155. The first component 150 and the second component 155 may also be mounted on the surface of the PCB 165. In this example, the first component 150 is electrically and/or communicatively coupled to the first row of pins 110 using a first set of signal lines 115. Likewise, the second component 155 is electrically and/or communicatively coupled to the second row of pins 120 using a second set of signal lines 125.

However, because the second row of pins 120 is positioned on the surface of the PCB 165 behind the first row of pins 110, multiple vias (e.g., via 130 and via 145) are needed to route the second set of signal lines 125 from the second row of pins 120, around/underneath the first row of pins 110, to the second component 155. For example, the second set of signal lines 125 is electrically and/or communicatively coupled to the second row of pins 120. The second set of signal lines 125 then extend through a first via 130 and an inner copper layer of the PCB 165 until they reach the second via 145. The second set of signal lines 125 may then be routed through the second via 145 and be electrically coupled to the second component 155.

As the number of vias increase, the chance for signal loss also increases. In an effort to reduce signal loss, a back drilling process may be performed on each via. A back drilling process removes an unused portion of a particular via that extends beyond a layer in the PCB 165 where the via terminates. As shown in FIG. 1B, a back drilling process has been performed on the first via 130 (represented by the shaded rectangle 135). Likewise, a back drilling process has been performed on the second via 145 (represented by the shaded rectangle 140). While back drilling may reduce the chance of signal loss, back drilling can be an expensive and time consuming process.

Figure 2:
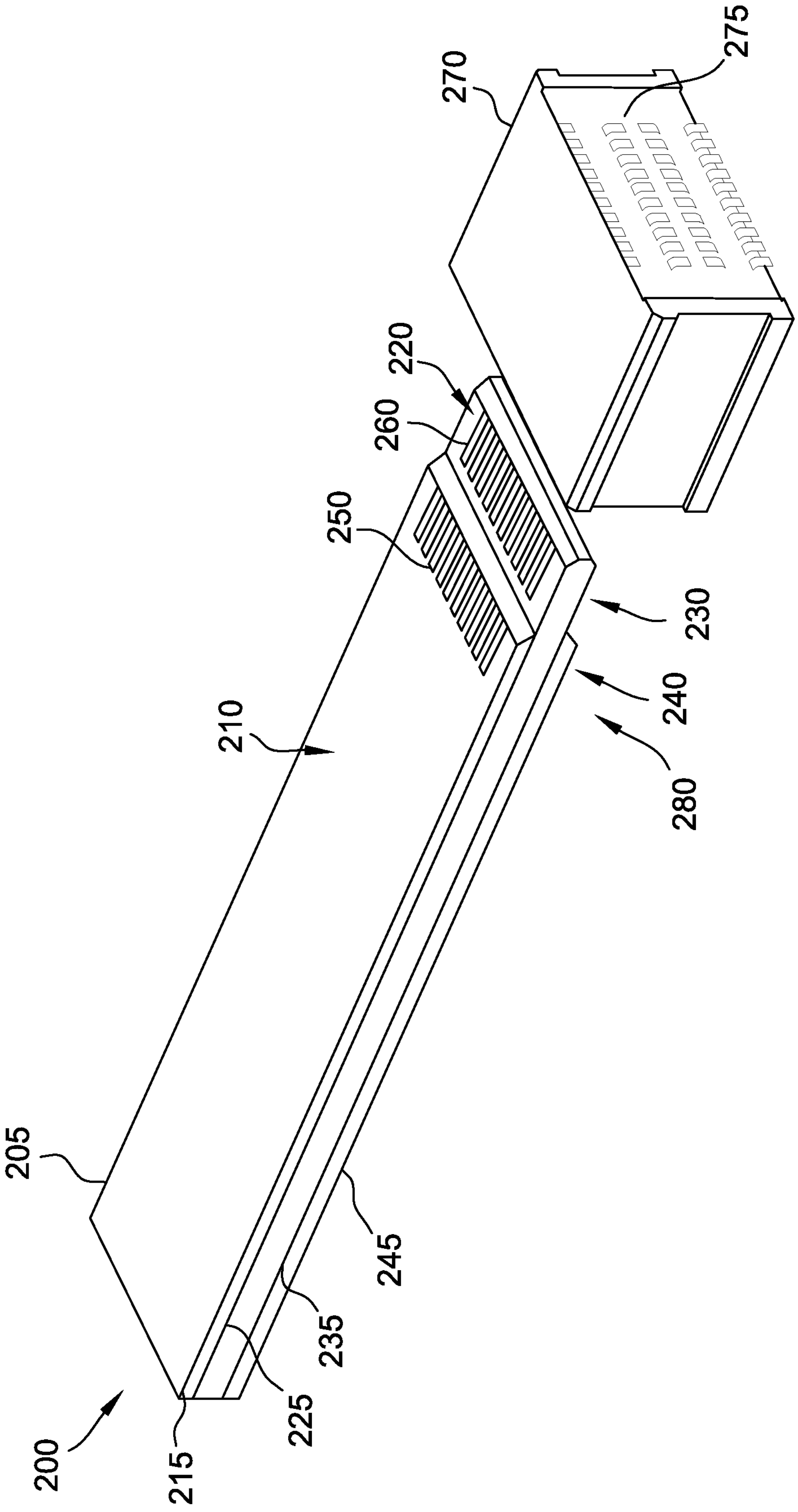
FIG. 2 illustrates an electronic device having a multi-plane high density connector according to an example.

FIG. 2 illustrates an electronic device 200 having a multi-plane high density connector 280 according to an example. The electronic device 200 may be a SSD or other data storage device. Although a SSD or a data storage device is specifically mentioned, the electronic device 200 may be any computing component or electronic device that can be removably coupled to a motherboard, or other component, of a host device.

In an example, the electronic device 200 includes a body 205. The body 205 may be a multi-layer PCB having multiple copper layers that are stacked on top of each other. For example, the body 205 of the electronic device 200 may include a first copper layer 215, a second copper layer 225, a third copper layer 235 and a fourth copper layer 245. Although four copper layers are shown and described, the body 205 may include any number of copper layers.

In an example, each copper layer may be separated from another copper layer by a substrate or other material. For example, a first substrate may be provided between the first copper layer 215 and the second copper layer 225. Likewise, a second substrate may be positioned between the third copper layer 235 and the fourth copper layer 245. In yet another example, a prepreg layer may be positioned between the second copper layer 225 and the third copper layer 235. In an example, the body 205 may be surrounded, or partially surrounded by a laminate or other material.

Additionally, each copper layer may have or otherwise be associated with an exposed surface that defines a plane. For example, the first copper layer 215 may have or otherwise be associated with a first exposed surface that defines a first plane 210, the second copper layer 225 may have or otherwise be associated with a second exposed surface that defines a second plane 220, the third copper layer 235 may have or otherwise be associated with a third exposed surface that defines a third plane 230 and the fourth copper layer 245 may have or otherwise be associated with a fourth exposed surface that defines a fourth plane 240.

In an example, the multi-plane high density connector 280 includes at least a portion of each exposed surface or plane. For example, the multi-plane high density connector 280 may include a portion of the first exposed surface that defines the first plane 210, a portion of the second exposed surface that defines the second plane 220, a portion of the third exposed surface that defines the third plane 230 and a portion of the fourth exposed surface that defines the fourth plane 240.

Additionally, each copper layer (and/or a substrate associated with each copper layer) of the multi-layer PCB that comprises the body 205 may have a length. In an example, some of the copper layers may have the same length, while other copper layers have different lengths. For example, the first copper layer 215 and the fourth copper layer 245 may have a first length while the second copper layer 225 and the third copper layer 235 may have a second, longer length. As such, the second exposed surface that defines the second plane 220 may extend past, or beyond, the first exposed surface that defines the first plane 210. Likewise, the third exposed surface that defines the third plane 230 may extend past, or beyond, the fourth exposed surface that defines the fourth plane 240.

In an example, each plane includes a row of pins or contacts provided on a surface. The row of pins may be gold finger contacts or any other suitable connection mechanism that enables the electronic device 200 to be communicatively coupled to, and removed from, a connector 270 associated with a host device. In the example shown in FIG. 2, the first plane 210 has a first row of pins 250 and the second plane 220 has a second row of pins 260. Although not shown in FIG. 2, the third plane 230 may have a third row of pins and the fourth plane 240 may have a fourth row of pins. Thus, each plane of the multi-plane high density connector 280 may have or otherwise be associated with its own row of pins or contacts.

In an example, when the multi-plane high density connector 280 is received by the connector 270, various contacts 275 within the connector 270 are arranged and/or positioned so as to contact the rows of pins on each respective plane. For example, a first set of contacts within the connector is arranged and/or positioned in a first plane of the connector 270 so as to only contact the first row of pins 250 on the first plane 210. Likewise, a second set of contacts within the connector 270 is arranged and/or positioned in a second plane of the connector 270 so as to only contact the second row of pins 260 on the second plane 220. Additionally, a third set of contacts may be arranged and/or positioned in a third plane within the connector 270 so as to only contact the third row of pins and a fourth set of contacts may be arranged and/or positioned within a fourth plane of the connector 270 so as to only contact the fourth row of pins.

Figure 3A:
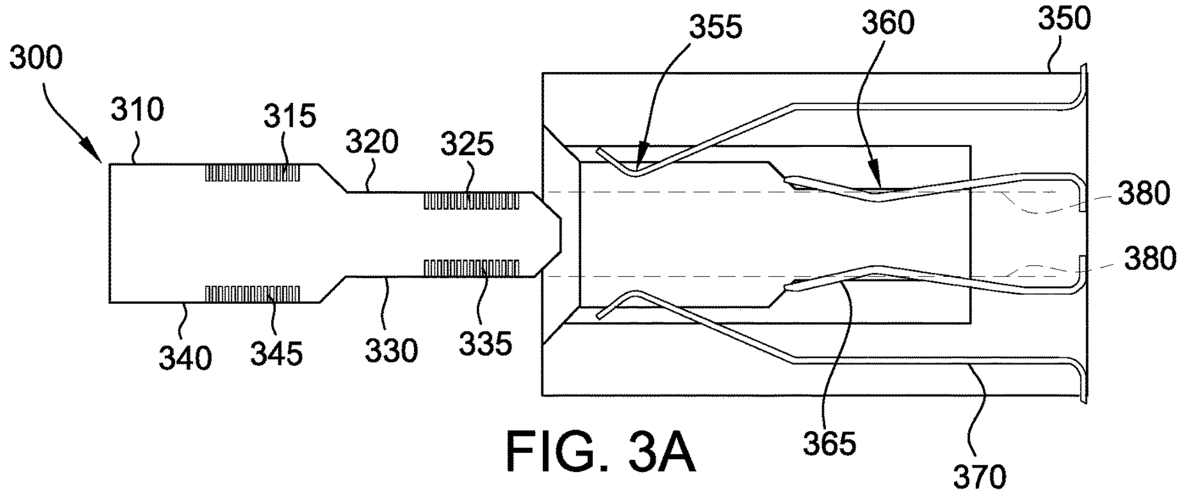
FIG. 3A-FIG. 3C illustrate how a multi-plane high density connector of an electronic device is received by a connector of a host device according to an example.
Figure 3B:
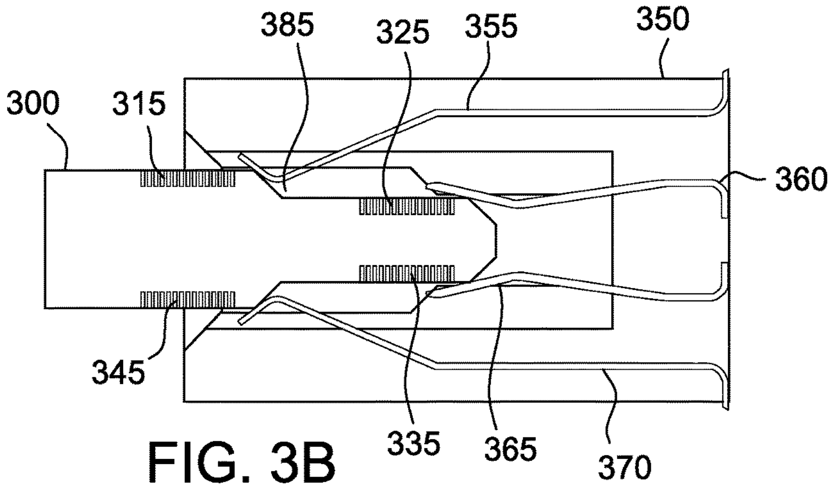
Figure 3C:
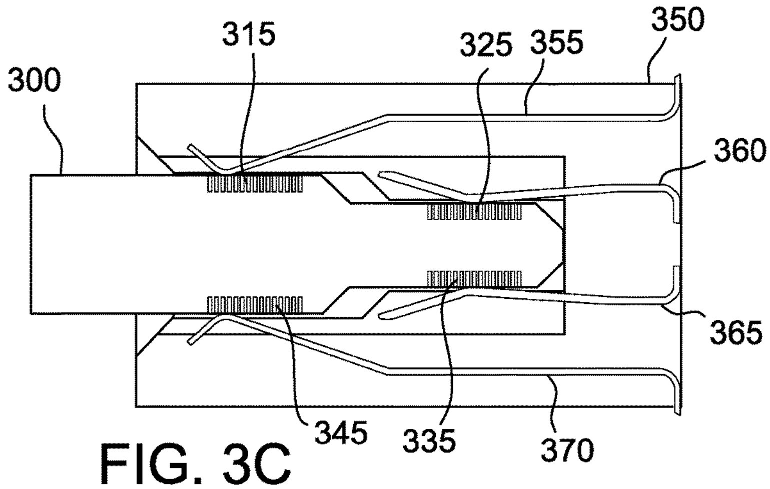

FIG. 3A-FIG. 3C illustrate how a multi-plane high density connector 300 of an electronic device is received by a connector 350 of a host device according to an example. In an example, the multi-plane high density connector 300 may be similar to the multi-plane high density connector 280 shown and described with respect to FIG. 2. Likewise, the connector 350 may be similar to the connector 270 shown and described with respect to FIG. 2.

Like the multi-plane high density connector 280, the multi-plane high density connector 300 includes at least a portion of each exposed surface (or plane) associated with each copper layer of a multi-layer PCB from which the multi-plane high density connector 300 extends. For example, the multi-plane high density connector 300 may include a portion of a first exposed surface of a first copper layer of the multi-layer PCB that defines a first plane 310, a portion of a second exposed surface of a second copper layer of the multi-layer PCB that defines a second plane 320, a portion of a third exposed surface of a third copper layer of the multi-layer PCB that defines a third plane 330 and a portion of a fourth exposed surface of a fourth copper layer of the multi-layer PCB that defines a fourth plane 340.

Additionally, each plane of the multi-plane high density connector 300 includes a row of pins or contacts provided on a surface. For example, the first plane 310 has a first row of pins 315, the second plane 320 has a second row of pins 325, the third plane 330 has a third row of pins 335 and the fourth plane 340 has a fourth row of pins 345.

The connector 350 may be shaped or otherwise configured to receive the multi-plane high density connector 300. For example, the connector 350 may include a number of different sets of contacts. In an example, each set of contacts is positioned within the connector 350 to align with the respective planes of the multi-plane high density connector 300.

For example, a first set of contacts 355 is configured and positioned within the connector 350 to contact the first row of pins 315 on the first plane 310. Likewise, a second set of contacts 360 is configured and positioned within the connector 350 to contact the second row of pins 325 on the second plane 320. The connector 350 also includes a third set of contacts 365 that are positioned and configured to contact the third row of pins 335 on the third plane 330 of the multi-plane high density connector 300 and a fourth set of contacts 370 that are positioned and configured to contact the fourth row of pins 345 on the fourth plane 340.

The connector 350 may also include one or more guiderails 380 (represented by dashed lines). In an example, the guiderails 380 receive an edge, a side, or another portion of the multi-plane high density connector 300 when the multi-plane high density connector 300 is inserted into (or removed from) the connector 350. The guiderails 380 may help ensure that the rows of pins on each of the different planes of the multi-plane high density connector 300 do not touch contacts in different planes.

FIG. 3B illustrates the multi-plane high density connector 300 being partially inserted into the connector 350 according to an example. As shown, the first set of contacts 355 are configured and positioned such that a gap 385 or space is present between the first set of contacts 355 and the second row of pins 325 on the second plane 320. Likewise, the fourth set of contacts 370 are configured and positioned in the same manner so as to not contact the third row of pins 335 on the third plane 330.

However, the second set of contacts 360 are positioned within the connector 350 such that the second set of contacts 360 engage with the second row of pins 325 on the second plane 320. Likewise, the third set of contacts 365 are configured and positioned to engage with the third row of pins 335 on the third plane 330.

FIG. 3C illustrates the multi-plane high density connector 300 being fully inserted into the connector 350 according to an example. As shown in FIG. 3C, when the multi-plane high density connector 300 is fully inserted into the connector 350, the first set of contacts 355 are electrically and/or communicatively coupled to the first row of pins 315 on the first plane 310, the second set of contacts 360 are electrically and/or communicatively coupled to the second row of pins 325 on the second plane 320, the third set of contacts 365 are electrically and/or communicatively coupled to the third row of pins 335 on the third plane 330 and the fourth set of contacts 370 are electrically and/or communicatively coupled to the fourth row of pins 345 on the fourth plane 340.

Figure 4:
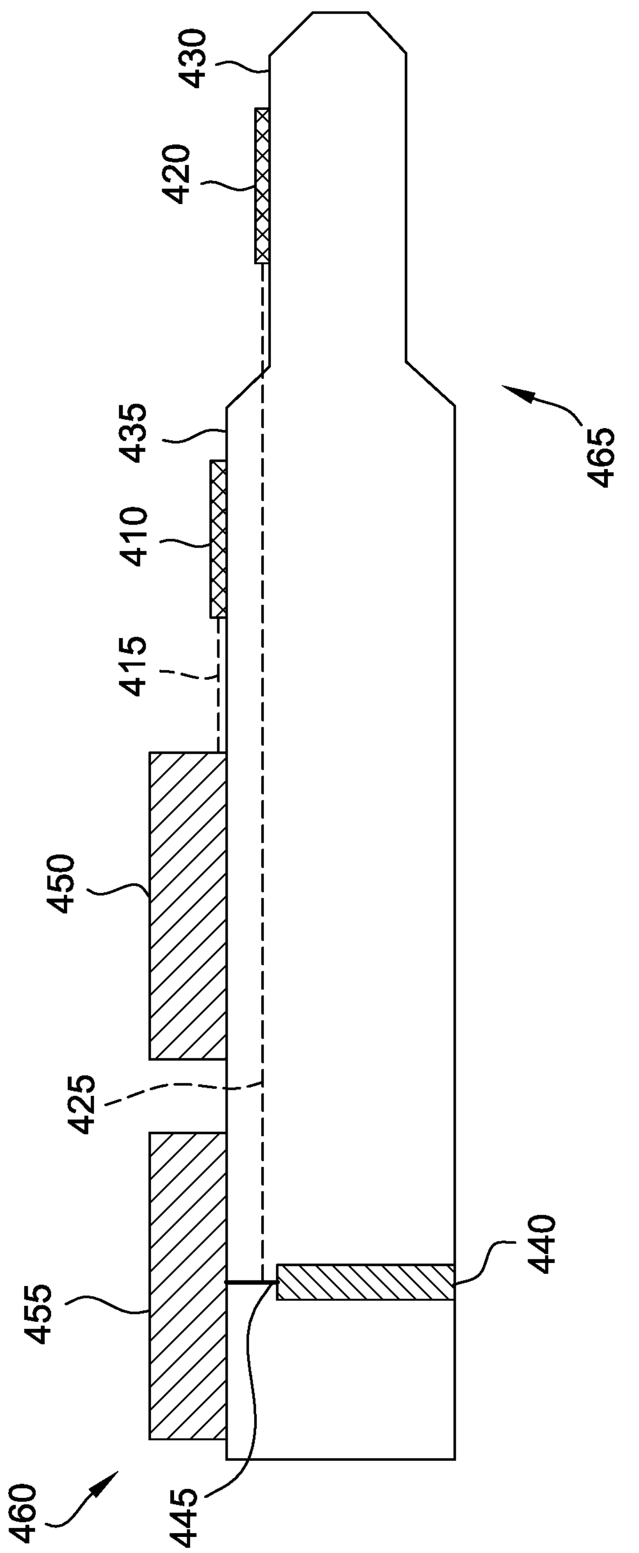
FIG. 4 illustrates how signals are routed to components of an electronic device using a multi-plane high density connector according to an example.

FIG. 4 illustrates how signals are routed to components of an electronic device 460 using a multi-plane high density connector 465 according to an example. In an example, the electronic device 460 may be similar to the electronic device 200 shown and described with respect to FIG. 2. Likewise, the multi-plane high density connector 465 may be similar to the multi-plane high density connector 280 shown and described with respect to FIG. 2.

The multi-plane high density connector 465 may include multiple rows of pins on each of its respective planes. For example, the multi-plane high density connector 465 includes a first row of pins 410 on a first plane 435 and a second row of pins 420 on a second plane 430.

Additionally, the electronic device 460 may include a first component 450 and a second component 455. Although two components are shown, the electronic device 460 may include more than two components. In an example, the first component 450 and the second component 455 are mounted on a top surface or plane of the electronic device 460. For example, the electronic device 460 may be comprised of a multi-layer PCB. In such an example, the first component 450 and the second component 455 may be mounted on a first layer (e.g., the first copper layer 215 (FIG. 2)) of the electronic device 460. In an example, the first component 450 and/or the second component 455 may be data storage components (e.g., NAND stacks), system components (e.g., a controller) or other computing components.

Although the components are shown being coupled to the top surface of the electronic device 460, additional components may be coupled to a bottom surface of the electronic device 460. Routing of signals between the various layers may be achieved in a similar manner as described below.

In this example, the first component 450 is electrically and/or communicatively coupled to the first row of pins 410 on the first plane 435 using a first set of signal lines 415. The first set of signal lines 415 originate from, and extend on or through, the first layer of the multi-layer PCB that defines or is otherwise associated with the first plane 435.

The second component 455 may be electrically and/or communicatively coupled to the second row of pins 420 on the second plane 430 using a second set of signal lines 425. However, unlike the example shown in FIG. 1 in which multiple vias (e.g., via 130 and via 145) are needed to route the second set of signal lines 125 from the second row of pins 120 to the second component 155, the different planes of the multi-plane high density connector 465 enable the second set of signal lines 425 to or originate from, or be routed directly from, the second row of pins 420 on the second plane 430. The second set of signal lines 425 may then extend on or through a second layer (e.g., the second copper layer 225 (FIG. 2)) of the multi-layer PCB that defines or is otherwise associated with the second plane 430. The second set of signal lines 425 extend along the second layer to a via 445. The second set of signal lines 425 may then be routed through the via 445 and be communicatively coupled to the second component 455 located on the first plane.

Because the number of vias needed to route signal lines between the various planes is reduced (when compared with current solutions such as shown in FIG. 1), the chance for signal loss decreases. Further, the current configuration reduces the need for additional back drilling processes (represented by the shaded rectangle 440) commensurate with the reduction to the number of vias.

Figure 5A:
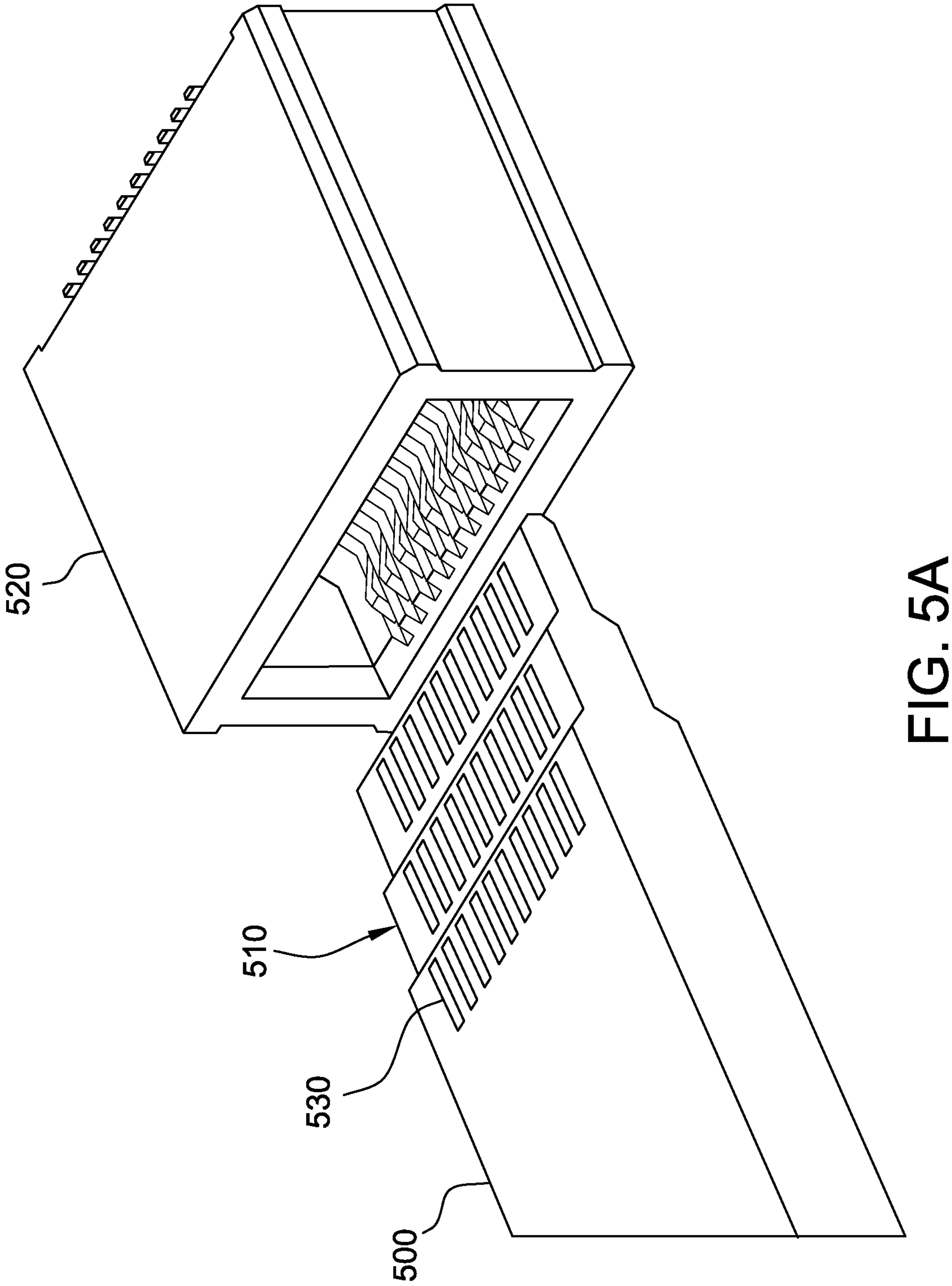
FIG. 5A illustrates an electronic device having another multi-plane high density connector according to an example.

FIG. 5A illustrates an electronic device 500 having another multi-plane high density connector 510 according to an example. In an example, the electronic device 500 may be similar to the electronic device 200 shown and described with respect to FIG. 2. Further, the multi-plane high density connector 510 may be similar to the multi-plane high density connector 280 shown and described with respect to FIG. 2. However, in the example shown in FIG. 5A, the multi-plane high density connector 510 includes six planes with each plane having a set or row of pins 530.

In an example, the multi-plane high density connector 510 may be removably coupled to a connector 520 in a similar manner as was described with respect to FIG. 3A-FIG. 3C.

Figure 5B:
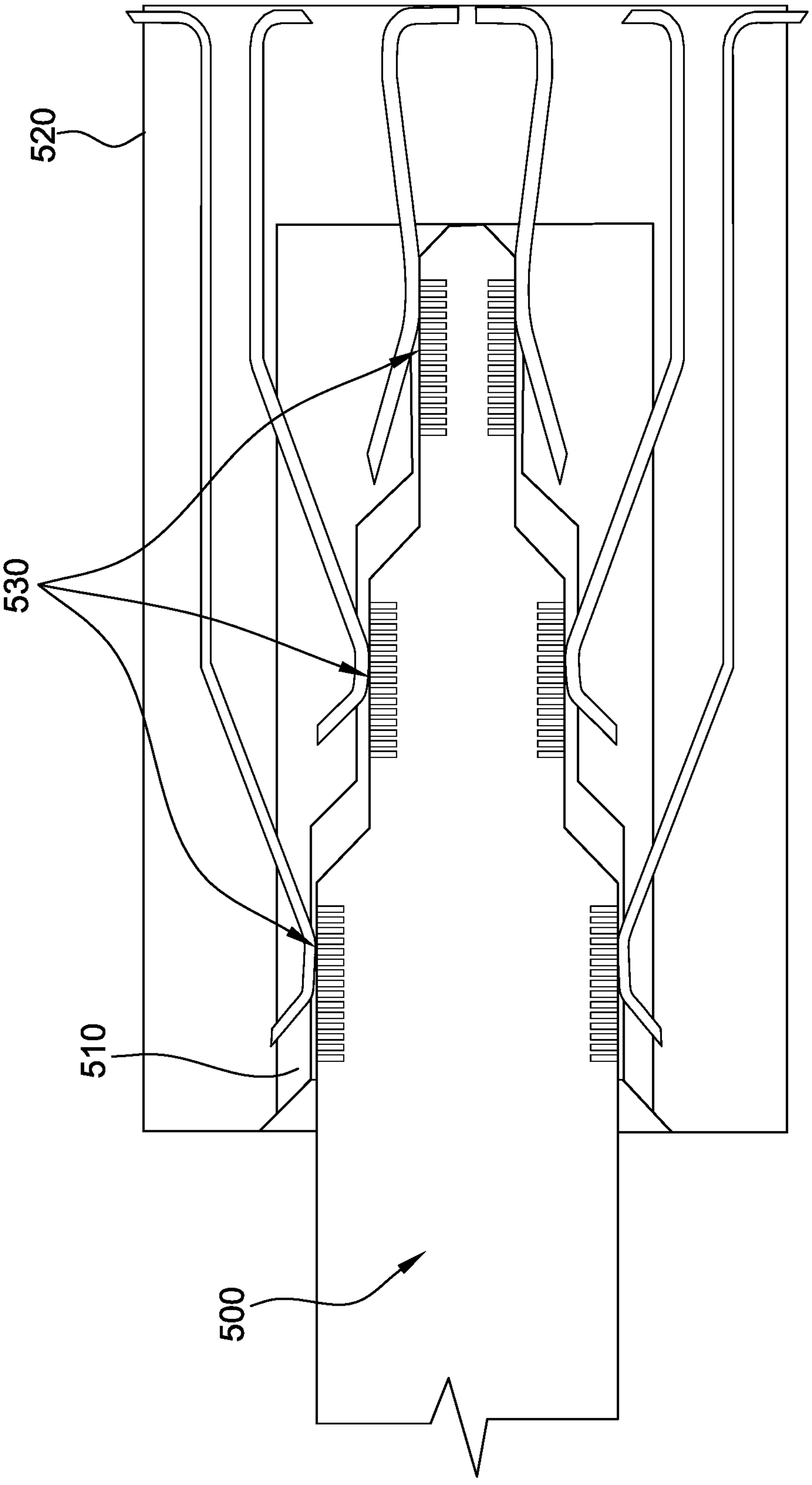
FIG. 5B illustrates how the multi-plane high density connector of FIG. 5A is received by a connector of a host device according to an example.

FIG. 5B illustrates how the multi-plane high density connector 510 of FIG. 5A is received by a connector 520 of a host device according to an example. As shown in FIG. 5B, one or more sets of contacts 530 of the connector 520 are electrically and/or communicatively coupled to a row of pins on respective planes of the multi-plane high density connector 510. Signals may be routed from the row of pins on each respective plane to various components such as previously described with respect to FIG. 4.

Although six total planes are shown with respect to FIG. 5A-FIG. 5B, the electronic device 500 may include any number of different planes.

Figure 6:
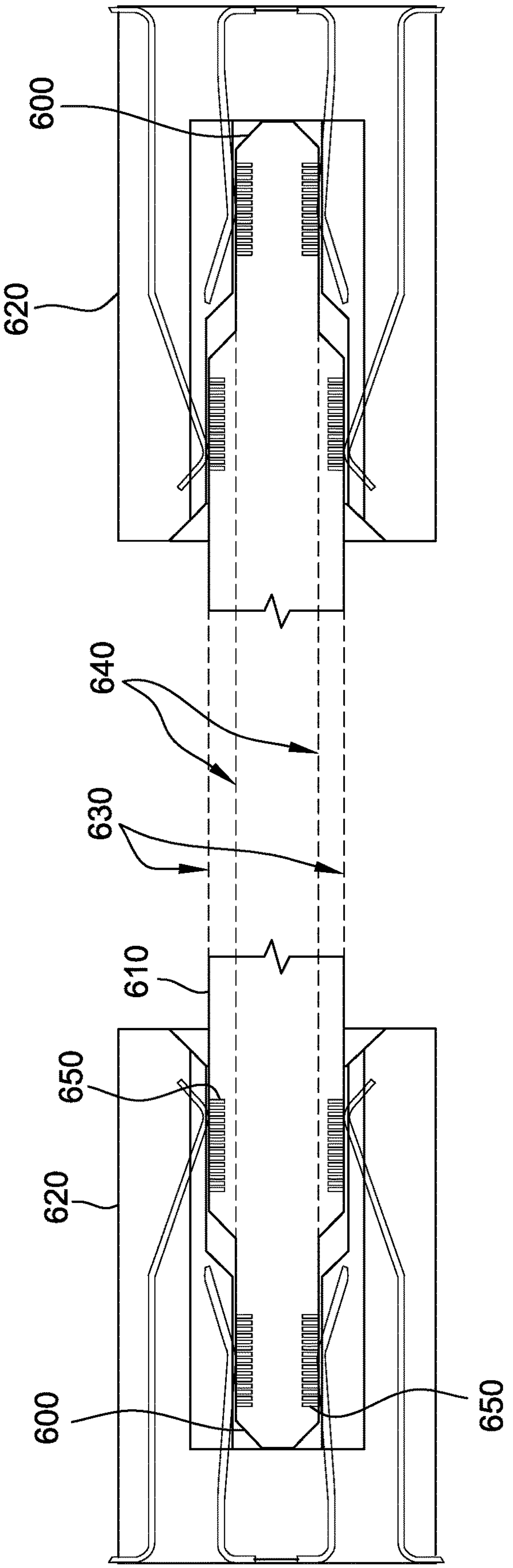
FIG. 6 illustrates how a multi-plane high density connector may be used with a pass-through PCB according to an example.

FIG. 6 illustrates how a multi-plane high density connector 600 may be used with a pass-through PCB 610 according to an example. In an example, the pass-through PCB 610 includes a first multi-plane high density connector 600 on a distal end and a second multi-plane high density connector 600 on a proximal end. Each multi-plane high density connector 600 may be connected to a respective connector 620. In an example, the connector 620 may be similar to the connector 350 shown and described with respect to FIG. 3. Likewise, each multi-plane high density connector 600 may be similar to the multi-plane high density connector 280 shown and described with respect to FIG. 2.

In an example, the pass-through PCB 610 may be a multi-layer PCB. For example, the pass-through PCB 610 may be comprised of a first copper layer, a second copper layer, a third copper third layer and a fourth copper layer. Further, each copper layer may define, or otherwise be associated with, a plane. As the multi-plane high density connector 600 extends from a proximal end and a distal end of the pass-through PCB 610, the multi-plane high density connector 600 may also include multiple planes.

As with the other multi-plane high density connectors described herein, each multi-plane high density connector 600 includes a row of pins 650 disposed on a surface on each plane. Additionally, a set of signal lines are connected to, and extend from, each row of pins on each plane. For example, a first set of signal lines 630 may connect a first row of pins on the first plane of the multi-plane high density connector 600 at the proximal end of the pass-through PCB 610 to a second row of pins on the first plane of the multi-plane high density connector 600 on the distal end of the pass-through PCB 610.

Likewise, a second set of signal lines 640 may connect a first row of pins on the second plane of the multi-plane high density connector 600 at the proximal end of the pass-through PCB 610 to a second row of pins on the second plane of the multi-plane high density connector 600 on the distal end of the pass-through PCB 610. In this example, because the various rows of pins are located on the same plane, transition vias are not required. As such, high transmission speeds may be available when compared with current solutions.

Based on the above, examples of the present disclosure describe an electronic device, comprising: a multi-layer printed circuit board (PCB) having a first exposed surface defining a first plane and a second exposed surface defining a second plane; and an edge connector extending from the multi-layer PCB and comprising: a first portion of the first exposed surface; a first set of pins provided on a surface of the first portion of the first exposed surface; a second portion of the second exposed surface, the second portion extending past the first portion of the first exposed surface; and a second set of pins provided on a surface of the second portion of the second exposed surface. In an example, the electronic device also includes a first component and a second component coupled to the first exposed surface. In an example, the electronic device also includes a first set of signal lines extending along the first plane between the first set of pins and the first component. In an example, the electronic device also includes a second set of signal lines extending along the second plane between the second set of pins and a via extending between a second layer of the multi-layer PCB and a first layer of the multi-layer PCB. In an example, the second set of signal lines extend through the via and are electrically coupled to the second component. In an example, the multi-layer PCB further comprises a third exposed surface defining a third plane and a fourth exposed surface defining a fourth plane. In an example, the edge connector further comprises: a third portion of the third exposed surface; a third set of pins provided on a surface of the third portion of the third exposed surface; a fourth portion of the fourth exposed surface, the fourth portion extending past the third portion of the third exposed surface; and a fourth set of pins provided on a surface of the fourth portion of the fourth exposed surface. In an example, the first set of pins provided on the surface of the first portion of the first exposed surface mate with first contacts of a connector on a corresponding first plane within the connector; and the second set of pins provided on the surface of the second portion of the second exposed surface mate with second contacts of the connector on a corresponding second plane within the connector.

Examples also describe an electronic device, comprising: a multi-layer printed circuit board (PCB) having a first layer and a second layer, wherein: the first layer defines a first plane; and the second layer defines a second plane and extends past the first layer; and an edge connector, comprising: a first portion of the first plane; a first row of pins on a surface of the first portion of the first plane; a second portion of the second plane; a second row of pins on a surface of the second portion of the second plane. In an example, the electronic device also includes a first component and a second component coupled to the first layer. In an example, the electronic device also includes a first set of signal lines extending along the first layer between the first row of pins and the first component. In an example, the electronic device also includes a second set of signal lines extending along the second layer between the second row of pins and a via between the first layer and the second layer. In an example, the second set of signal lines extend from the second row of pins, through the via, and are electrically coupled to the second component. In an example, the first component and the second component are data storage components. In an example, the first row of pins on the surface of the first portion of the first plane mate with first contacts of a connector on a corresponding first plane within the connector; and the second row of pins on the surface of the second portion of the second plane mate with second contacts of a connector on a corresponding second plane within the connector.

Examples of the present disclosure also describe an electronic device, comprising: a multi-layer printed circuit board (PCB); a multi-plane connection means extending from the multi-layer PCB and comprising: a first set of contact means provided on a first plane of the multi-plane connection means; and a second set of contact means provided on a second plane of the multi-plane connection means, the second plane extending beyond the first plane. In an example, the electronic device also includes a first set of signal means extending along the first plane between the first set of contact means and a first component provided on the first plane. In an example, the electronic device also includes a second set of signal means originating from the second set of contact means on the second plane, the second set of signal means extending to a via provided between a first layer of the multi-layer PCB and a second layer of the multi-layer PCB. In an example, the second set of signal means extend through the via and are electrically coupled to a second component provided on the first plane. In an example, the first set of contact means provided on the first plane of the multi-plane connection means mate with first contact means of a connector means on a corresponding first plane within the connector means; and the second set of contact means provided on the second plane of the multi-plane connection means mate with second contact means of the connector means on a corresponding second plane within the connector means.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. An electronic device, comprising:

a multi-layer printed circuit board (PCB) having a plurality of layers stacked on top of one another, the plurality of layers including a first layer having a first exposed surface defining a first plane and a second layer having a second exposed surface defining a second plane; and an edge connector extending from the multi-layer PCB and comprising:

a first portion of the first exposed surface;

a first set of pins provided on a surface of the first portion of the first exposed surface;

a second portion of the second exposed surface, the second portion extending past the first portion of the first exposed surface; and a second set of pins provided on a surface of the second portion of the second exposed surface.

2. The electronic device of claim 1, further comprising a first component and a second component coupled to the first exposed surface.

3. The electronic device of claim 2, further comprising a first set of signal lines extending along the first plane between the first set of pins and the first component.

4. The electronic device of claim 2, further comprising a second set of signal lines extending along the second plane between the second set of pins and a via extending between the second layer of the multi-layer PCB and the first layer of the multi-layer PCB.

5. The electronic device of claim 4, wherein the second set of signal lines extend through the via and are electrically coupled to the second component.

6. The electronic device of claim 1, wherein the multi-layer PCB further comprises a third exposed surface defining a third plane and a fourth exposed surface defining a fourth plane.

7. The electronic device of claim 6, wherein the edge connector further comprises:

a third portion of the third exposed surface;

a third set of pins provided on a surface of the third portion of the third exposed surface;

a fourth portion of the fourth exposed surface, the fourth portion extending past the third portion of the third exposed surface; and a fourth set of pins provided on a surface of the fourth portion of the fourth exposed surface.

8. The electronic device of claim 1, wherein the layers of the multi-layer PCB comprise copper layers separated from one another by a substrate, and wherein the first layer and the second layer are electrically coupled to one another.

9. The electronic device of claim 1, wherein the multi-layer PCB includes a transition ramp having a sloped surface extending between the first exposed surface and the second exposed surface.

10. The electronic device of claim 1, wherein power is fed to the second layer of the multi-layer PCB along the second plane.

11. An electronic device, comprising:

a multi-layer printed circuit board (PCB) having a first layer and a second layer stacked on the first layer, wherein:

the first layer defines a first plane; and the second layer defines a second plane and extends past the first layer; and an edge connector, comprising:

a first portion of the first plane;

a first row of pins on a surface of the first portion of the first plane;

a second portion of the second plane; and a second row of pins on a surface of the second portion of the second plane.

12. The electronic device of claim 11, further comprising a first component and a second component coupled to the first layer.

13. The electronic device of claim 12, further comprising a first set of signal lines extending along the first layer between the first row of pins and the first component.

14. The electronic device of claim 12, further comprising a second set of signal lines extending along the second layer between the second row of pins and a via between the first layer and the second layer.

15. The electronic device of claim 14, wherein the second set of signal lines extend from the second row of pins, through the via, and are electrically coupled to the second component.

16. The electronic device of claim 12, wherein the first component and the second component are data storage components.

17. An electronic device, comprising:

a multi-layer printed circuit board (PCB) having a first layer and a second layer stacked on the first layer;

a multi-plane connection means extending from the multi-layer PCB and comprising:

a first set of contact means provided on a first plane of the multi-plane connection means; and a second set of contact means provided on a second plane of the multi-plane connection means, the second plane extending beyond the first plane.

18. The electronic device of claim 17, further comprising a first set of signal means extending along the first plane between the first set of contact means and a first component provided on the first plane.

19. The electronic device of claim 17, further comprising a second set of signal means originating from the second set of contact means on the second plane, the second set of signal means extending to a via provided between the first layer of the multi-layer PCB and the second layer of the multi-layer PCB.

20. The electronic device of claim 19, wherein the second set of signal means extend through the via and are electrically coupled to a second component provided on the first plane.

* * * * *